United States Patent Office 3,468,933
Patented Sept. 23, 1969

3,468,933
HYDROXYMETHANE CARBOXYLIC ACID ESTERS AND PROCESS FOR THEIR MANUFACTURE

Robert Burns Woodward, 12 Oxford St.,
Cambridge, Mass. 02138
No Drawing. Filed Aug. 22, 1966, Ser. No. 573,886
Claims priority, application Switzerland, Sept. 10, 1965,
12,623/65; Dec. 9, 1965, 16,976/65, 16,977/65;
Jan. 13, 1966, 449/66, 450/66
Int. Cl. C07c 69/66
U.S. Cl. 260—483   15 Claims

ABSTRACT OF THE DISCLOSURE

Process (and products obtained thereby), wherein an oxomethane carboxylic acid ester is reacted with malonic dialdehyde or with a salt thereof, and, if desired, water is eliminated from a resulting α-diformylmethyl-α-hydroxy-methane carboxylic acid ester, and/or, if desired, a resulting compound is converted into an oxo derivative thereof. The products are intermediates for the preparation of 7 - amino-cephalosporanic acid and derivatives thereof.

---

The present invention provides a methodological process for the manufacture of α - diacylmethyl-α-hydroxymethane-carboxylic acid esters and the dehydrated products thereof, which was used in the manufacture of valuable intermediates and especially in the first synthetic production of 7-amino-cephalosporanic acids and of its derivatives and which is particularly suitable for this peculiar synthesis.

7-amino-cephalosporanic acid corresponds to the following Formula XVI

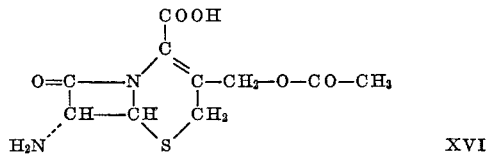

Derivatives are in the first place N-acyl compounds in which the acyl radicals are especially those of pharmacologically active N-acyl derivates of 7-amino-cephalosporanic acid, such as the thienylacetyl, e.g. 2-thienylacetyl, cyanoacetyl, chlorethylcarbamyl or phenylacetyl radical, or readily eliminable acyl radicals, such as the residue of a carbonic acid semi-ester, for example, the tertiary butyloxycarbonyl residue.

The synthesis of this compound and of its derivatives, which are important to the manufacture of valuable medicaments, starts from a 3,5-unsubstituted 2,2-disubstituted thiazolidine-4-carboxylic acid, for example from a compound of the Formula I to the following reaction scheme:

and this novel synthesis is carried out, for example, according to the following scheme of formulae:

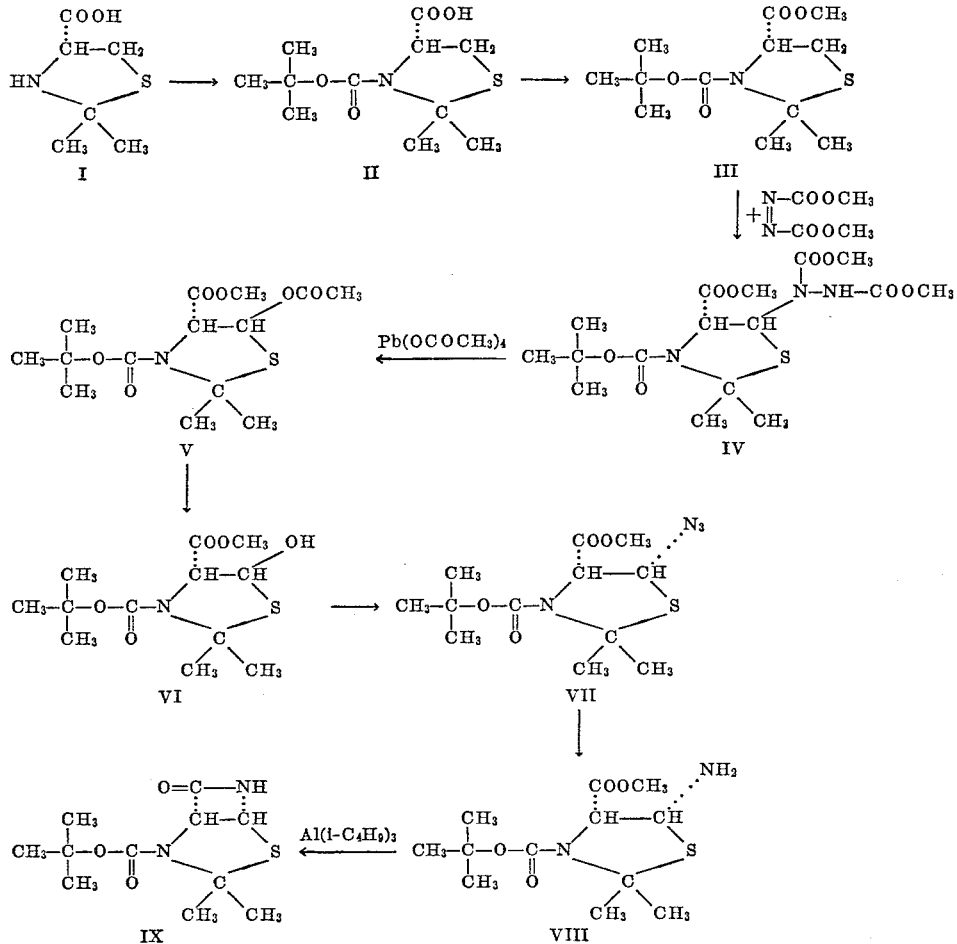

The compound IX is converted into the desired 7-amino-cephalosporanic acid and its derivatives as follows:

anecarboxylic acid esters are corresponding esters of pyruvic, α-ketobutyric or α-ketoglutaric acid.

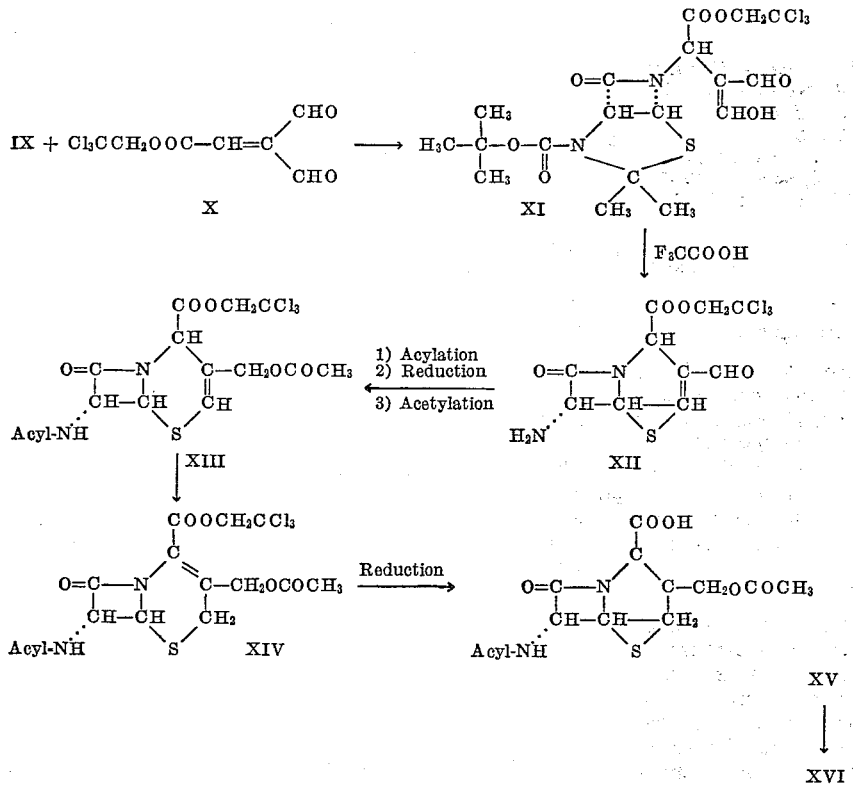

The compound of the Formula X used as intermediates is prepared in the following manner:

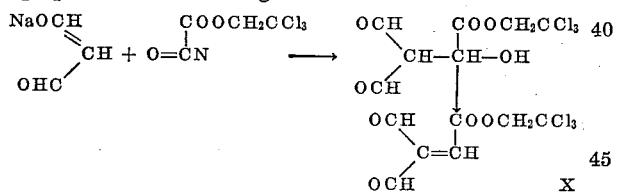

The above-mentioned valuable intermediates are unexpectedly obtained when an oxomethane carboxylic acid ester, is reacted with malonic dialdehyde compound or with a salt thereof, and, if desired, water is eliminated from a resulting α-diformylmethyl-α-hydroxy-methane carboxylic acid ester, and/or, if desired, a resulting compound is converted into an oxo derivative thereof.

An oxomethane carboxylic acid ester used as starting material is especially an ester with an alcohol, such as an aliphatic, cycloaliphatic or aralipathic alcohol. Such esters are in the first place alkyl esters, such as lower alkyl esters, for example, methyl, ethyl, n-propyl, isopropyl, n-butyl or isobutyl esters, cycloalkyl such as cyclohexyl esters, or phenyl-lower alkyl such as benzyl, phenylethyl or diphenylmethyl esters. The alcohol residues of these esters are unsubstituted, but may also be substituted, for example, by lower alkyl such as methyl, ethyl or isopropyl groups, by lower alkoxy such as methoxy or ethoxy groups, nitro, or trifluoromethyl groups or especially by halogen such as fluorine, chlorine or bromine atoms. Preferred substituted alcohol residues are halogeno-lower alkyl groups, for example, 2,2,2-trichloroethyl groups.

Oxomethanecarboxylic acids are preferably mesoxalic acid and glyoxylic acid; their esters are in the first place aliphatic or aralipathic esters such as lower alkyl, for example, methyl or ethyl esters, or halogeno-lower alkyl such as 2,2,2-trichlorethyl esters, or phenyl-lower alkyl such as benzyl or diphenylmethyl esters. Other oxometh- A salt of the malonic dialdehyde is a salt of the enol-tautomer, being above all an alkali metal salt such as the sodium salt, which, if desired, may be formed in situ. The reaction of the malonic dialdehyde with the oxomethane carboxylic acid ester is carried out in the absence or presence of a solvent or solvent mixture, with cooling, at room temperature or with heating, if necessary, in the presence of a condensing agent and/or a catalyst, in an inert gas and/or under superatmospheric pressure.

The compounds obtained by this invention are valuable intermediates which are primarily suitable for the manufacture of diformylmethylene-methane carboxylic acid esters and their tautomers, such as the compound of the Formula X, into which they can be converted by dehydration.

The elimination of water is achieved, for example, by way of thermal dehydration preferably in the presence of a suitable solvent, such as a high-boiling hydrocarbon, such as an aromatic hydrocarbon, for example, toluene, xylene or cymene, or linear or branched aliphatic hydrocarbons, for example, linear or branched octanes, nonanes or decanes, or cycloaliphatic hydrocarbons, for example, dimethylcyclohexane or methane, or substituted hydrocarbons, for example, nitrobenzene or chlorobenzene, or of high-boiling ethers, for example, diphenyl ether, or of any other suitable solvent or solvent mixture. Usually the process is carried out at a temperature above 100° C., preferably at 120 to 180° C., generally at the boiling temperature of the solvent used, while preferably removing generated water from the reaction mixture, for example, by azeotropic distillation. If necessary, the reaction is carried out in an inert gas.

Resulting compounds can be converted in known manner into their oxo derivatives, such as enolethers, acetals, oximes, hydrazones, semicarbazones, thiosemicarbazones or bisulphite adducts.

The invention includes also any modification of the process in which a compound obtained as intermediate is used as starting material and any remaining step or steps is or are carried out with it, or in which starting materials are used in the form of derivatives, for example salts, therefore or are formed during the reaction.

Preferably used starting materials and reaction conditions are those which give rise to the preferred products specially mentioned above.

The products resulting from the process of the invention are esters of α-diformylmethylene-α-hydroxy-methane carboxylic acids which are unsubstituted in the α-position or may be substituted by an optionally substituted, for example, esterified carboxyl group or by an esterified carboxyl-lower alkyl group, and their tautomers. Such esters are especially compounds of the formula

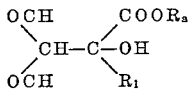

wherein $R_a$ represents the residue of an alcohol, such as an unsubstituted or substituted aliphatic or araliphatic hydrocarobn residue, especially a lower alkyl or a halogen-lower alkyl residue, for example the 2,2,2-trichloroethyl residue, or a phenyl-lower alkyl radical, and $R_1$ stands primarily for hydrogen, as well as the group —$COOR_b$, where $R_b$ represents the residue of an alcohol, such as one of the above-mentioned residues, or their tautomers.

The diformylmethyl-methane carboxylic acid ester (obtained from these α-diformylmethyl-α-hydroxy-methane carboxylic acid esters by dehydration), in which the 2-position may be unsubstituted or, if desired, substituted by an additional esterified carboxyl group or by an esterified carboxy-lower alkyl group, and their tautomers, are extremely reactive starting materials suitable for a wide variety of uses. As mentioned above, compounds of this type, particularly the compound of the Formula X are suitable for use in the above described first synthesis of 7-amino-cephalosporanic acid. These are above all the compounds of the Formula Xa

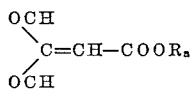

wherein $R_a$ has the previously given meaning. The conversion into the 7-amino-cephalosporanic acid derivatives thereof, may be carried out by the process described, for example, in patent application Ser. No. 573,866 filed Aug. 22, 1966 and Ser. No. 573,876, filed Aug. 22, 1966. They are, for example, reacted with the $N_1$-unsubstituted 4,4-disubstituted 3-acyl - 2-oxo-azetidino[3,2-d]thiozolidine compounds, such as the compound of the Formula IX, prepared according to the procedure described in patent application Ser. No. 573,815, filed Aug. 22, 1966.

Apart from serving as intermediates in the synthesis of 7-amino-cephalosporanic acid and its derivatives, diformylmethylene-methane carboxylic acid esters, particularly the compounds of the formula

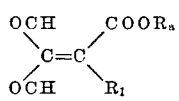

in which $R_a$ and $R_1$ have the previously given meaning, may be used, similar to tetracyanoethylene [J. Am. Chem. Soc., 80, 2775–2844 (1958) and Chem. Ing. News, 38, issue 15, 114–124 (1960)], for example, in the formation of colored complexes with aromatic hydrocarbons, as dienophile in the Diels-Alder synthesis of cyclic compounds, as component in the preparation of dyestuffs, for example, with aromatic amines, or of heterocyclic nuclei of a wide variety, etc.

The starting materials used in the present process are known. An alkali metal salt, especially the sodium salt, of the malonic dialdehyde is preferably prepared by hydrolyzing a 1,1,3,3-tetraalkoxy-propane with acid, especially an aqueous mineral acid, such as hydrochloric, sulphuric, perchloric or fluoboric acid, or a sulphonic acid such as p-toluene sulphonic or p-bromobenzene sulphonic acid, if necessary, at an elevated temperature. The resulting free malonic dialdehyde is advantageously converted with aqueous alkali metal hydroxide, such as potassium hydroxide or sodium hydroxide, in the cold into an alkali metal salt which is easily precipitated in pure form by adding a water-miscible solvent, such as acetone, tetrahydrofuran, dioxane or 1,2-dimethoxyethane.

The following examples illustrate the invention.

Example 1

7.55 grams of freshly prepared mesoxalic acid diethyl ester (obtained by dehydrating the hydrate in toluene and subsequent distillation) are added to 3.13 g. of freshly prepared malonic dialdehyde. The mixture heats up almost immediately and solidifies; the reaction product is triturated with 50 ml. of methylene chloride, stirred overnight at room temperature and then filtered. After washing with mixtures of acetone and hexane the resulting α-diformyl-methyltartronic acid diethyl ester in the tautomeric of the formula

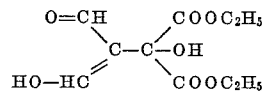

crystallizes from a mixture of acetone and hexane and melts at 128–130.5° C. (analytical sample: M.P. 130.5° C.). Infrared absorption bands (in methylene chloride) at 2.85μ, 5.75μ, 6.04μ, 6.32μ, 7.34μ, 7.75μ to 7.85μ, 8.2μ, 8.45μ, 9.07μ, 9.75μ and 10.3μ. Ultraviolet absorption bands in ethanol+acid:$\lambda_{max}$ 244 mμ ($\epsilon$=24,350), and in ethanol:$\lambda_{max}$ 247mμ and 268 mμ. A further quantity of the desired product can be obtained by heating the mother liquor with an additional amount of mesoxalic acid ethyl ester.

The malonic dialdehyde used as starting material is obtained in the following manner:

A mixture of 80 ml. of 1 N hydrochloric acid and 200 ml. of water is mixed with 220 g. of 1,1,3,3-tetraethoxypropane and stirred for 25 minutes at 55° C. under nitrogen, then cooled to 0° C. and while being stirred treated with 200 ml. of a 5 N sodium hydroxide solution; during this addition, which takes 10 minutes, the mixture is cooled to maintain it below 10° C. The red-orange solution (pH about 10) is evaporated under vacuum at a bath temperature of 40° C. in a rotary evaporator and the residue is triturated with 600 ml. of a 9:1-mixture of acetone and ethanol. The solid material is filtered off and washed with 200 ml. of the solvent mixture and once with ether. The resulting product is dried under reduced pressure over potassium hydroxide and then dissolved in 650 ml. of methanol at room temperature. The solution is treated with charcoal, filtered through a filter aid and rinsed with 100 ml. of methanol. While stirring vigorously, 3500 ml. of methylene chloride are added and the mixture is kept for 30 minutes at −15° C. and then filtered. The residue is washed with 250 ml. of a 9:1-mixture of methylene chloride and methanol and twice with methylene chloride, and the sodium salt of malonic dialdehyde is dried for 3 hours at 35 to 40° C. under 15 mm. Hg pressure. Infrared absorption bands (in potassium bromide) at 3μ (broad) and 6.3μ (broad). Ultraviolet absorption bands in ethanol:$\lambda_{max}$ 268 mμ ($\epsilon$=10,500), and in water:$\lambda_{max}$ 268 mμ ($\epsilon$=23,300). A further quantity of malonic dialdehyde salt in the form of the dihydrate, which can be converted by drying into the monohydrate, is obtained from the filtrate.

The malonic dialdehyde sodium salt can also be prepared in the following manner:

A mixture of 88 g. of 1,1,3,3-tetraethoxypropane, 44 ml. of water and 32 ml. of 1 N hydrochloric acid is stirred at 55° C. After about 9 minutes a homogeneous mixture forms which is stirred for an additional 5 minutes at 55° C., then cooled to 5° C. and mixed under nitrogen and while stirring treated with a cold solution of 15.6 g. of sodium hydroxide in 24 ml. of water, while maintaining the temperature below 10° C. by efficient cooling with an ice-salt mixture. On addition of 640 ml. of acetone the sodium salt of malonic dialdehyde precipitates, is filtered off, washed with acetone and ether and dried for 3 hours at room temperature under 15 mm. Hg pressure over potassium hydroxide and then for 3 hours under 0.01 mm. Hg pressure; the product is obtained in the form of its dihydrate. A further amount of the product can be isolated from the filtrate.

A stirred, ice-cooled suspension of 1 g. of the sodium salt of malonic dialdehyde in 70 ml. of dry ether is mixed dropwise with an equimolar amount of an ether solution of hydrogen chloride; the reaction mixture is stirred for 30 minutes in an ice bath and then filtered under anhydrous conditions. The residue is washed with 20 ml. of dry ether and the solution filtered. The combined filtrates are evaporated under exclusion of moisture, yielding the crystalline malonic dialdehyde.

Free malonic dialdehyde can also be prepared in the following manner:

A stirred, ice-cooled suspension of 5 g. of the sodium salt of malonic dialdehyde in 400 ml. of methylene chloride (free from ethanol) is mixed dropwise with 25 ml. of a 1.9 N solution of hydrochloric acid in ether; the mixture is stirred for an additional hour, then filtered through anhydrous sodium sulphate with exclusion of moisture and evaporated, to yield crystalline malonic dialdehyde melting at 65–68° C. Infrared absorption bands (in methylene chloride) at $6.18\mu$, $6.30\mu$ and $10.17\mu$. Ultraviolet absorption bands in ethanol+hydrochloric acid: $\lambda_{max}$ 243 m$\mu$ ($\epsilon=17{,}450$), and in ethanol+potassium hydroxide solution: $\lambda_{max}$ 269 m$\mu$ ($\epsilon=26{,}200$).

Example 2

A suspension of 1.88 g. of the sodium salt of malonic dialdehyde (dried and in powder form) is mixed with 3.5 g. of freshly distilled mesoxalic acid diethyl ester. The mixture warms up, turns reddish and forms a clear solution on addition of 10 ml. of methanol. The solution is heated for 10 minutes on a water bath and then evaporated to dryness under vacuum, and the residue is triturated with a mixture of 20 ml. of methylene chloride and 10 ml. of pentane. After filtering and washing with an equal quantity of the identical solvent mixture the white filter residue is dissolved in 10 ml. of water, mixed with 2 g. of sodium chloride and 4 g. of citric acid, and the resulting solution extracted with 3×70 ml. of methylene chloride. The organic extract is dried and evaporated; the residue is crystallized from a mixture of acetone and hexane to yield $\alpha$-diformylmethyl-tartronic acid diethyl ester melting at 127.5–130° C. A further quantity of the desired product can be obtained from the methylene-chloride+pentane washings and from the mother liquor.

Example 3

A total of 5.2 g. of the sodium salt of malonic dialdehyde dihydrate is stirred into a solution of 16 g. of $\alpha$-hydroxytartronic acid di-2,2,2-trichloroethyl ester hydrate in 40 ml. of methanol. The solid material dissolves immediately, but after a few minutes a precipitate begins to form and the reaction product solidifies, whereupon the stirring is discontinued. After 20 minutes 200 ml. of ether are added, the precipitate is filtered off and washed with ether, and the filtrate is evaporated to dryness under vacuum. The residue is triturated with 150 ml. of ether and filtered off; the filtrate furnishes an oily product which contains 2,2,2-trichloroethanol.

The filtered-off material and the solid material obtained by trituration are taken up in 200 ml. of methylene chloride, mixed with 7.7 g. of citric acid in 200 ml. of water and agitated until a solution is obtained. The aqueous phase is extracted with 2×150 ml. of methylene chloride and the organic solutions are washed with 100 ml. of water, dried and evaporated, to yield $\alpha$-diformylmethyl-tartronic acid di-2,2,2-trichloroethyl ester in the tautomeric form of the formula

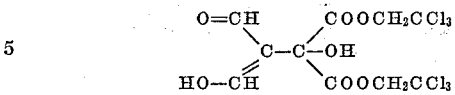

which is purified by trituration with pentane and melts at 140 to 143° C. (analytical sample: 140–141° C.). Infrared absorption bands (in methylene chloride) at $2.85\mu$, $5.70\mu$, $6.05\mu$, $6.34\mu$, $7.36\mu$, $8.56\mu$, $9.02\mu$ and $9.78\mu$. Ultraviolet absorption bands in ethanol: $\lambda_{max}$ 248 m$\mu$ ($\epsilon=12{,}300$), in ethanol+base: $\lambda_{max}$ 270 m$\mu$ ($\epsilon=25{,}000$), in ethanol+acid: $\lambda_{max}$ 247 m$\mu$ ($\epsilon=14{,}000$) and in hexane: 274 m$\mu$ ($\epsilon=5{,}420$). A further quantity of the desired product can be obtained from the filtrate.

The starting material used in the above example is obtained in the following manner:

A mixture of 41.6 g. of malonic acid, 150 g. of 2,2,2-trichloroethanol and 0.4 g. of p-toluene sulphonic acid hydrate in 150 ml. of toluene is refluxed for 16 hours at a bath temperature of 150° C. while stirring and collecting the generated water in a water separator. The solution is combined with the toluene phase from the water separator, diluted with 150 ml. of ether, washed with 2×160 ml. of a 2% sodium hydrogen carbonate solution and once with 100 ml. of water and combined with the ether solution obtained by back-washing the aqueous washings, dried and the low-boiling ether and toluene are evaporated under reduced pressure at a bath temperature of about 40° C. The residue is heated in a distillation apparatus (Vigreux column, 12 cm.) to a bath temperature of 160° C. under 16 mm. Hg pressure (the distillate obtained is discarded) and the residue is distilled. The pure malonic acid di-2,2,2-trichloroethyl ester is collected at 120–122° C./0.25 mm. Hg after a fore-run up to 120° C./0.25 mm. Hg.

The same product can also be prepared as follows:

A mixture of 90 g. of 2,2,2-trichloroethanol, 50 ml. of pyridine and 100 ml. of dry benzene is mixed under anhydrous conditions within 30 minutes with a solution of 34 g. of freshly distilled malonyl dichloride in 100 ml. of dry benzene, while cooling the mixture to maintain it at 10° to 20° C. The red solution is then stirred for 40 minutes at 70° C., cooled and filtered, the residue (pyridine hydrochloride) rinsed with benzene and the filtrate washed with 2×75 ml. of 2 N sulphuric acid, then with 75 ml. of water, 75 ml. of a saturated sodium hydrogen carbonate solution and again with water. The washings are washed with 100 ml. of benzene each time, the combined benzene solutions are dried and evaporated in a water-jet vacuum. The residue is distilled and the main fraction of malonic acid di-2,2,2-trichloroethyl ester is obtained at 122–126° C./0.37 mm. Hg. Infrared absorption bands (in methylene chloride) at $5.70\mu$, $6.95\mu$, $7.13\mu$, $7.30\mu$, $7.55\mu$, $8.80\mu$, $9.70\mu$, $10.47\mu$, $11.40\mu$, $12.50\mu$, $13.90\mu$ and $14.55\mu$.

A mixture of 73.5 g. of malonic acid di-2,2,2-trichloroethyl ester and 34.5 ml. of acetic acid is mixed within 30–60 minutes while being stirred with a solution of 41.5 g. of sodium nitrite in 50 ml. of water; the temperature is maintained by cooling at 15–20° C. and the reaction vessel is closed off against the ambient atmosphere. The reaction mixture solidifies and is stirred with the aid of a spatula, kept overnight at room temperature and then diluted with 500 ml. of methylene chloride and 200 ml. of water. The aqueous phase is extracted with 2×250 ml. of methylene chloride, and the combined organic extracts are washed with 100 ml. of water, dried and evaporated. The crystalline residue is dissolved in 250 ml. of ether, the solution filtered and concentrated to a volume of 80 ml., and the desired $\alpha$-oximino-malonic acid di-2,2,2-trichloroethyl ester crystalized by adding 400 ml. of pentane. The product melts at 120–121° C. Infrared absorption bands (in methylene chloride) at $2.83\mu$, $5.69\mu$, 7.28μ 7.66μ, 8.22μ, 9.03μ and 9.53μ. Ultraviolet absorption bands in ethanol: λ_max 225mμ (ε=9100) and in ethanol +1 drop of N-sodium hydroxide solution: λ_max 283 mμ (ε=15,600), end absorption at 215 mμ (ε=16,400). By concentrating the mother liquor a further quantity of the desired product can be obtained.

A solution of 40 g. of α-oximino-malonic acid di-2,2,2-trichloroethyl ester in 400 ml. of ether is mixed with a solution of diazomethane in ether until the evolution of nitrogen ceases and the faint yellow coloration persists for 10 minutes, about 400 ml. of diazomethane solution being required. The excess reagent is decomposed by adding a few ml. of acetic acid, the solution is evaporated and the residue, containing a mixture of α-methylamino-malonic acid di-2,2,2-trichloroethyl ester-N-oxide and of α-methoxyimino-malonic acid di-2,2,2-trichloroethyl ester, is dissolved in 400 ml. of tetrahydrofuran, mixed with 50 ml. of concentrated hydrochloric acid and the mixture is stirred for 1 hour at room temperature. A total of 60 g. of crystalline sodium acetate is then added and the mixture is concentrated under reduced pressure to a small volume, then diluted with 400 ml. of methylene chloride, washed with 2×200 ml. of water and the washings are extracted with 200 ml. of methylene chloride. The combined organic extracts are dried, concentrated under vacuum and then evaporated to dryness under 0.1 mm. Hg. pressure. The crystalline residue is triturated with 120 ml. of pentane and kept at −10° C. to yield the α-hydroxy-tartronic acid di-2,2,2-trichloroester melting at 113–115° C. Infrared absorption bands (in methylene chloride) at 2.82μ, 5.70μ, 7.36μ, 7.80μ, 8.37μ, 8.85μ and 12.15μ.

The residue from the mother liquor is chromatographed on silica gel containing 5% of water. After eluting the α-methoxyimino-malonic acid di-2,2,2-trichloroethyl ester [M.P. 48–49° C. after recrystallization from aqueous methanol; infrared absorption bands (in methylene chloride) at 5.69μ, 6.30μ, 7.30μ, 7.62μ, 8.22μ, 9.02μ and 9.65μ: ultraviolet absorption bands (in ethanol) λ_max 237Mμ (ε=9150)] with benzene and a 1:1-mixture of benzene and ethyl acetate, elution with ethyl acetate alone furnishes a further quantity of α-hydroxy-tartronic acid di-2,2,2-trichloroethyl ester.

A suspension of 5 g. of α-hydroxy-tartronic acid di-2,2,2-trichloroethyl ester in 50 ml. of toluene is refluxed for 4½ hours with the use of a water separator. The solvent is then removed under atmospheric pressure and the residue is distilled under 0.02 mm. Hg pressure. The desired mesoxalic acid di-2,2,2-trichloroethyl ester is obtained at 113–120° C./0.02 mm. Hg and crystallizes slowly at room temperature. This compound may be used as starting material instead of its hydrate, the α-hydroxy-tartronic acid di-2,2,2-trichloroethyl ester.

Example 4

A solution of 0.223 g. of glyoxylic acid 2,2,2-trichloroethyl ester hydrate in 8 ml. of dry toluene is dehydrated by being heated for 2 hours at 120° C., then cooled to room temperature and stirred for 2½ hours with a solution of 0.075 g. of malonic dialdehyde in toluene. The solvent is evaporated and the residue triturated to yield 3,3-diformyllactic acid 2,2,2-trichloroethyl ester in the tautomeric form of the formula

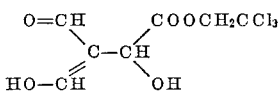

melting at 114–116° C. Infrared absorption bands (in potassium bromide) at 5.7μ and 6.2μ; ultraviolet absorption bands in ethanol + acid λ_max 247 mμ (ε=19,100) and in ethanol + base λ_max 269 mμ (ε=27,600).

The starting material used in the above example is prepared in the following manner:

A mixture of 33.5 g. of d-tartaric acid, 200 ml. of freshly distilled 2,2,2-trichloroethanol, 100 ml. of absolute toluene and 1.92 g. of p-toluene sulphonic acid hydrate is stirred under reflux for 12 hours, the generated water (8 ml.) being collected in a water separator. The reaction mixture is washed with 3× 50 ml. of a 1:1-mixture of a saturated sodium hydrogen carbonate solution and ice water and with 2× 60 ml. of ice water; the aqueous solutions are extracted with benzene and the combined organic solutions dried over sodium sulphate and evaporated. The excess of 2,2,2-trichloroethanol is distilled off and the residue dissolved in 200 ml. of hot benzene. The solution is diluted with 100 ml. of hexane, cooled and seeded. Crystalline d-tartaric acid di-2,2,2-trichloroethyl ester is filtered off, washed with hexane and dried at room temperature. After recrystallization from benzene it melts at 101.5–103.5° C.; [α]_D=+9°±1° (c.=1.04 in chloroform). Infrared absorption bands (in methylene chloride) at 2.75μ, 5.7μ, 7.35μ, 7.8μ, (8.3μ), 8.5μ, 8.9μ, 9.15μ, 9.95μ and 12.35μ. A further quantity of the desired product can be isolated from the mother liquor.

The ester referred to above can also be prepared as follows:

A mixture of 58.5 g. of d-tartaric acid and 312 g. of 2,2,2-trichloroethanol in 150 ml. of toluene, containing 10 g. of a strongly acidic ion exchange resin (strongly acidic cation exchanger for analytical purposes, Merck, Darmstadt, Germany) which has previously been washed for 20 minutes with 2 N sulphuric acid and then with 2000 ml. of water and toluene, is heated for 17½ hours at a bath temperature of 140° C., the generated water being collected in a water separator. Another 80 g. of 2,2,2-trichloroethanol are added and the mixture is once more heated for 28 hours; total quantity of separated water:20.3 ml. After filtration through a filter aid, which is rinsed with toluene, the filtrate is concentrated at 40° C./10 mm. Hg the excess 2,2,2-trichloroethanol distilled off at 58° C./0.2 to 0.5 mm. Hg, and the residue is stirred for 30 minutes in 1000 ml. of a 7:1-mixture of benzene and ethyl acetate with 300 g. of silica gel containing 5% of water. After filtration and washing with 500 ml. of the solvent mixture the filtrate is evaporated and the residue caused to crystallize from 20 ml. of ether by the dropwise addition of 75 ml. of pentane; it yields the d-tartaric acid di-2,2,2-trichloroethyl ester, M.P. 100 to 103° C., which is washed with a 1:7-mixture of ether and pentane. A further quantity of the desired ester can be isolated from the mother liquor.

A solution of 123.4 g. of d-tartaric acid di-2,2,2-trichloroethyl ester in 2000 ml. of methanol is diluted with 800 ml. of water. The mixture is cooled to 10° C. and within 45 minutes mixed dropwise at a temperature of 10 to 12° C. with a solution, heated at 30 to 40° C., of 70.59 g. of sodium periodate in 600 ml. of water. When room temperature has been reached, the reaction mixture is stirred for an additional 19 hours at 23° C., then 600 g. of sodium chloride and 2000 ml. of ethyl acetate are added. After stirring for 2 hours the organic phase is separated; the residual mixture is vigorously stirred for 20 minutes with 1000 ml. of ethyl acetate, the organic solution separated and once more extracted with 1000 ml., then with 500 ml. of ethyl acetate. The first 2 extracts are combined, dried over sodium sulphate and evaporated; the residue is once more evaporated to dryness with toluene. The other two extracts are treated in the same manner, combined with the residue first obtained and extracted with 1× 500 ml. and with 2× 250 ml. of hot acetone. The solvent is evaporated, a mixture of the residue in 500 ml. of benzene is evaporated to dryness and the crude product is dissolved in 1600 ml. of boiling benzene and filtered. Then 2–3 ml. of water are added and the mixture is stirred at 5° C., to yield, after washing with benzene and pentane and drying on the air, the glyoxylic acid 2,2,2-trichloroethyl ester hydrate in colourless flakes melting at 94.5–95.5° C. A further quantity of the desired product can be isolated from the mother liquor.

The starting material can also be prepared in this manner:

A total of 8.87 g. of lead tetraacetate is added with stirring and cooling to 4–9° C. to a mixture of 8.26 g. of d-tartaric acid di-2,2,2-trichloroethyl ester in 130 ml. of absolute benzene, the reaction mixture is stirred for 20 minutes with cooling and then for 85 minutes at room temperature and filtered. The filter residue is rinsed with 150 ml. of benzene and the filtrate evaporated at 40° C. under reduced pressure. The residue is evaporated to dryness with xylene, dried at 40° C./0.5 mm. Hg, dissolved in 200 ml. of warm methylene chloride and filtered while warm. The filtrate is concentrated and the residue chromatographed on 50 times its own weight of silica gel containing 5% of water. After washing with 700 ml. of benzene and 1400 ml. of a 9:1-mixture of benzene and ethyl acetate, a further 10,000 ml. of this mixture elute first a small quantity of starting material and then the glyoxylic acid 2,2,2-trichloroethyl ester hydrate; it is dissolved in acetone, the solution is filtered and evaporated, the residue is dissolved hot in 9 ml. of acetone, diluted with 11 ml. of hexane and crystallized while being cooled. It melts at 94.5–95.5° C. Infrared absorption bands (potassium bromide) at $3.0\mu$, $3.1\mu$, $5.7\mu$, $6.85\mu$, $7.0\mu$, $7.3\mu$, $7.9\mu$, $8.35\mu$, $9.05\mu$, $9.15\mu$, $9.25\mu$, $9.35\mu$, $9.5\mu$, $11.1\mu$, $12.5\mu$, $12.7\mu$ and $14.1\mu$.

Example 5

The pH value of a solution of 22.5 g. of crude sodium salt of malonic dialdehyde dihydrate in 500 ml. of water is adjusted with 1 N sulphuric acid to about 9, and 33.5 g. of crystalline glyoxylic acid 2,2,2-trichloroethyl ester hydrate are added to the solution. On vigorous stirring a clear, yellow solution is obtained which after about 1½ to 2½ hours, if necessary, after filtration, is acidified to pH about 3 by slowly adding 150 ml. of 1 N sulphuric acid while cooling at 5° C. The mixture is seeded, then stirred for 2 to 3 hours at 0° C. and filtered; the residue is dried and the resulting 3,3-diformyl-lactic acid 2,2,2-trichloroethyl ester melts at 114–116° C. By continuous extraction of the filtrate with ether in a Soxhlet apparatus a further quantity of the desired product, melting at 114–116° C., can be isolated.

Example 6

A solution of 0.134 g. of glyoxylic acid benzhydryl ester hydrate in 1 ml. of methanol is mixed with 0.049 g. of the sodium salt of malonic dialdehyde, and the mixture is kept for 16 hours at room temperature in a closed vessel. After evaporating the yellowish orange solution under reduced pressure a yellow, glassy substance is obtained which is triturated with 2×5 ml. of ether. The insoluble residue (sodium salt of 3,3-diformyl-malic acid benzhydryl ester) is dissolved in 4 ml. of water, mixed with 0.1 g. of citric acid, and the suspension is extracted with 20 ml. of a 2:1-mixture of methylene chloride and ethyl acetate. After drying, the organic extract is evaporated under reduced pressure and the crystalline residue recrystallized from a 1:4-mixture of acetone and hexane. The resulting 3,3-diformyl-lactic acid benzhydryl ester of the formula

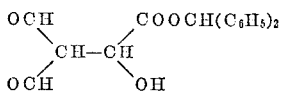

melts at 114.5–117° C. Infrared absorption bands (in methylene chloride) at $3\mu$ (broad), $5.8\mu$, $6.03\mu$, $6.12\mu$, $8.32\mu$ (strong) and $9.32\mu$.

The starting material used in the above example is prepared in the following manner:

While stirring and cooling a solution of 1.841 g. of glyoxylic acid hydrate in 20 ml. of dry tetrahydrofuran is treated dropwise with a solution of 3.88 g. of diphenyl diazomethane in 25 ml. of ether within ½ hour while maintaining the temperature at 10° C. After stirring for one hour the faintly pinkish solution is evaporated under reduced pressure and the yellow, viscous oil is dissolved in 250 ml. of methylene chloride and stirred with a 1:1-mixture of a saturated sodium hydrogen carbonate solution and ice water, while adding a small amount of a saturated sodium chloride solution to break the emulsion. The organic phase is dried over magnesium sulphate and evaporated under reduced pressure. The resulting residue is chromatographed on 250 g. of silica gel. After washing with 2250 ml. of benzene, the desired glyoxylic acid benzhydryl ester hydrate is eluted in syrupy form with 2000 ml. of a 9:1-mixture of benzene and ethyl acetate and isolated in fractions 3–7 of a total of 7 fractions. Infrared absorption bands (in methylene chloride) at $2.85\mu$, $5.75\mu$, $6.72\mu$, $8.27\mu$ and $9.2\mu$.

Example 7

A total of 18.8 g. of the sodium salt of malonic dialdehyde is stirred into a solution of 38.4 g. of mesoxalic acid diethyl ester hydrate in 140 ml. of methanol. The clear, red solution is allowed to stand for 35 minutes and then concentrated within 3½ hours, under reduced pressure without heating, filtered and washed with 650 ml. of a 9:1-mixture of methylene chloride and hexane; the filtrate is again filtered and the filter residue combined with the first filter residue and dissolved in 130 ml. of water. The solution is acidified with 20 g. of citric acid to pH 3, 600 ml. of methylene chloride and 10 ml. of hexane are added, the mixture is vigorously agitated, 40 ml. of a saturated sodium chloride solution are added and the mixture is once more agitated. The aqueous solution is again extracted with 600 ml. of methylene chloride and 10 ml. of hexane and with 2× 300 ml. of methylene chloride, the organic extracts are combined and the residue recrystalized from acetone. The resulting α-diformyl-methyl-tartronic acid diethyl ester is washed with hexane, M.P. 126.5–127.5° C. From the mother liquor and the aqueous phase further quantities of the desired product can be obtained.

Example 8

A mixture of 1.75 g. of glyoxylic acid ethyl ester and 1.27 g. of malonic dialdehyde freshly prepared from the sodium salt warms up to about 45° C. and a semisolid, orange coloured product is formed. A clear solution is prepared by adding 10 ml. of ether and heating, then the ether is distilled off under atmospheric pressure and the residue heated under reduced pressure at 50–60° C. The residue represents the crude 3,3-diformyl-lactic acid ethyl ester of the formula

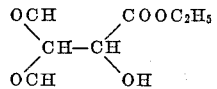

Infrared absorption bands (in methylene chloride) at $2.80\mu$, $3.5\mu$, $3.65\mu$, $5.78\mu$, $5.95\mu$, $6.12\mu$ and about $8.25\mu$. Ultraviolet absorption bands in ethanol: $\lambda_{max}$ 248 m$\mu$, in ethanol+0.1 N-hydrochloric acid: $\lambda_{max}$ 245 m$\mu$ and in ethanol+0.1 N potassium hydroxide solution: $\lambda_{max}$ 269 m$\mu$.

Example 9

A suspension of 10 g. of α-diformyl-methyltartronic acid diethyl ester in 250 ml. of dry xylene is immersed in an oil bath of 140° C. while being stirred with exclusion of moisture, whereupon within a few minutes a clear solution forms. After 165 minutes the solvent is evaporated and the residue extracted with 7×100 ml. of hexane heated at 40 to 50° C. The hexane extracts are evaporated and the oily residue is distilled. The desired diformyl-methylene-malonic acid diethyl ester of the formula

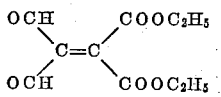

is collected at 104 to 107° C./0.04 mm. Hg. Infrared absorption bands (in carbon tetrachloride) at $5.75\mu$ (broad)

and 5.9μ. Ultraviolet absorption bands in hexane: $\lambda_{max}$ 227 mμ, and in ethanol: $\lambda_{max}$ 243 mμ (broad). When the hexane-insoluble residue is crystallized from acetone, unreacted starting material, M.P. 125° C., is recovered.

Example 10

At 130° C., a solution of 0.5 g. of α-diformylmethyl-tartronic acid diethyl ester in 10 ml. of acetonitrile is added within 3 hours to 10 ml. of xylene, 10 ml. of distillate being collected. The solvents are evaporated and the residue triturated with carbon tetrachloride, to yield crude diformylmethylene-malonic acid diethyl ester.

Example 11

At 130° C., 25 ml. of xylene are mixed within 1½ hours with a solution of 1 g. of α-diformylmethyl-tartronic acid diethyl ester in 20 ml. of 1,2-dimethoxyethane, 15 ml. of distillate being collected. The solvents are evaporated and the residue extracted with hot cyclohexane, to yield as crude product diformylmethylene-malonic acid diethyl ester and a residue which is insoluble in cyclohexane and contains unreacted starting material.

Example 12

A mixture of 0.3 g. of α-diformylmethyl-tartronic acid di-2,2,2-trichloroethyl ester and 30 ml. of n-octane is refluxed for 24 hours, the generated water being removed by recycling the condensate to the reaction solution through a tube filled with calcium hydride. The deep yellow reaction product, which contains a small amount of a dark resin, is cooled, whereupon a small amount of unreacted starting material crystallizes out. The solution is filtered, the filtrate is evaporated and the residue yields the crude diformylmethylene-malonic acid di-2,2,2-trichloroethyl ester of the formula

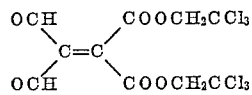

as a yellow oil which crystallizes almost completely upon standing. Infrared absorption bands (in methylene chloride) at 5.72μ, 5.88μ, 5.95μ, 6.08μ, 6.24μ, 7.35μ and 8.30μ.

Example 13

A solution of 0.277 g. of 3,3-diformyl-lactic acid 2,2,2-trichloroethyl ester in 5 ml. of 1,2-dimethoxyethane is stirred dropwise under nitrogen within 50 minutes into 15 ml. of gently boiling n-octane, during which the bath temperature is maintained so that at the same time 10 ml. of the solvent mixture can be distilled off. A dark yellow solution is obtained, during the elimination of water and subsequent cooling polymeric material begins to precipitate in flocks and as a yellowish brown resin. The solution is decanted from the solid material and evaporated at a bath temperature of 30° C./0.2 mm. Hg to yield the 3,3-diformylacrylic acid 2,2,2-trichloroethyl ester of the formula

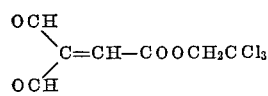

as a yellow oil which decomposes on slow distillation under 0.001 mm. Hg pressure. When a flask, maintained under a pressure of 0.001 mm. Hg, is immersed into an oil bath pre-heated at 140° C., the desired product can be sublimed within 15 to 30 seconds in the form of a yellow oil which becomes viscid on cooling. In the nuclear magnetic resonance spectrum (in carbon tetrachloride) the product reveals signals at 4.82 p.p.m. (2H), 7.07 (1H), 9.92 and 10.44 p.p.m. (1H each). Infrared absorption spectrum (in carbon tetrachloride) bands at 3.70μ, 5.75μ, 5.98μ, 6.15μ, 7.35μ, 8.50μ, 9.70μ and 10.70μ. Ultraviolet absorption spectrum (in cyclohexane) $\lambda_{max}$ 234 mμ.

Example 14

A vessel containing a solution of 0.3 g. of 3,3-diformyl-lactic acid 2,2,2-trichloroethyl ester in 5 ml. of freshly distilled phthalic acid dibenzyl ester, equipped with a water-cooled cooling finger, is evacuated to a pressure of 0.001 mm. Hg and immersed in an oil bath pre-heated at 140° C. The elimination of water is accompanied by strong frothing and the solution turns yellow, with the desired 3,3-diformyl-acrylic acid 2,2,2-trichloroethyl ester condensing on the cooling finger.

What is claimed is:

1. A member selected from the group consisting of a compound of the formula

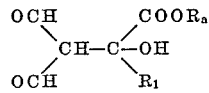

in which $R_a$ is a member selected from the group consisting of a lower alkyl, a halogeno-lower alkyl and a phenyl-lower alkyl radical, and $R_1$ is a member selected from the group consisting of hydrogen and the group of the formula —$COOR_b$, in which $R_b$ is a member selected from the group consisting of a lower alkyl, a halogeno-lower alkyl and a phenyl-lower alkyl radical, and a tautomer thereof.

2. A compound as claimed in claim 1 and being a member selected from the group consisting of a compound of the formula given in claim 1.

$$\begin{bmatrix} OCH \\ \phantom{OC}\diagdown \\ \phantom{OCH}CH-CH-COOR_a \\ \diagup\phantom{OCH}\phantom{OC}| \\ OCH\phantom{OCH}OH \end{bmatrix}$$

in which $R_1$ is hydrogen and $R_a$ is a member selected from the group consisting of a lower alkyl, a halogeno-lower alkyl and a phenyl-lower alkyl radical, and a tautomer thereof.

3. A compound of the formula

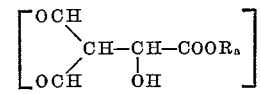

in which $R_a$ is a member selected from the group consisting of a lower alkyl, a halogeno-lower alkyl and a phenyl-lower alkyl radical, and $R_1$ is a member selected from the group consisting of hydrogen and the group of the formula —$COOR_b$, in which $R_b$ is a member selected from the group consisting of a lower alkyl, a halogeno-lower alkyl and a phenyl-lower alkyl radical.

4. A compound as claimed in claim 2 and being a member selected from the group consisting of 3,3-diformyl-lactic acid 2,2,2-trichloroethyl ester and a tautomer thereof.

5. A compound as claimed in claim 2 and being a member selected from the group consisting of 3,3-diformyl-lactic acid benzhydryl ester and a tautomer thereof.

6. A compound as claimed in claim 2 and being a member selected from the group consisting of 3,3-diformyl-lactic acid ethyl ester and a tautomer thereof.

7. A compound as claimed in claim 1 and being a member selected from the group consisting of α-diformyl-methyl-tartronic acid diethyl ester and a tautomer thereof.

8. A compound as claimed in claim 1 and being a member selected from the group consisting of α-diformyl-methyl-tartronic acid di-2,2,2-trichloroethyl ester and a tautomer thereof.

9. A compound as claimed in claim 3 and being diformyl-methylene-malonic acid diethyl ester.

10. A compound as claimed in claim 3 and being diformylmethylene - malonic acid di - 2,2,2 - trichloroethyl ester.

11. A compound as claimed in claim 3 and being 3,3-diformyl-acrylic acid 2,2,2-trichloroethyl ester.

12. A compound as claimed in claim 3 and being a compound of the formula given in claim 3

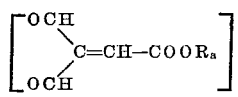

in which $R_1$ is hydrogen and $R_a$ is a member selected from the group consisting of a lower alkyl, a halogeno-lower alkyl and a phenyl-lower alkyl radical.

13. Process for the manufacture of a member selected from the group consisting of esters of diformylmethylene-methane carboxylic acids and tautomers thereof, wherein an oxo-methane carboxylic acid ester of an acid selected from the group consisting of mesoxalic and glyoxylic acid is reacted with a member selected from the group consisting of malonic dialdehyde and an alkali metal salt thereof and water is eliminated from the resulting α-diformyl-methyl-α-hydroxymethane carboxylic acid ester at a temperature above 100° C.

14. Process as claimed in claim 13, wherein water is eliminated in the presence of a high-boiling solvent selected from the group consisting of an aromatic hydrocarbon, a straight-chain aliphatic hydrocarbon, a branched-chain aliphatic hydrocarbon, a cycloaliphatic hydrocarbon and a substituted hydrocarbon.

15. Process as claimed in claim 13, wherein water is eliminated by thermic dehydration at temperatures between about 120° and about 180°.

References Cited

UNITED STATES PATENTS 2,831,884  4/1965  Pommer et al. _____ 260—483

OTHER REFERENCES

Chem. Abstracts: 45:1029d, 45:8463g, 47:2755g, 43:577i, 40:5958⁷.

LORRAINE A. WEINBERGER, Primary Examiner

V. GARNER, Assistant Examiner

U.S. Cl. X.R.

260—239.1, 243, 302, 306.8

CASE WO-9/WO-10/1+2/E

PO-1050
(5/69)

UNITED STATES PATENT OFFICE
CERTIFICATE OF CORRECTION

Patent No. 3,468,933    Dated September 23, 1969

Inventor(s) ROBERT BURNS WOODWARD

It is certified that error appears in the above-identified patent and that said Letters Patent are hereby corrected as shown below:

Column 14, line 29, after "claim 1", delete "." ; line 30, delete the structural formula.

Column 15, line 5, delete the structural formula.

SIGNED AND
SEALED
NOV 17 1970

(SEAL)
Attest:

Edward M. Fletcher, Jr.
Attesting Officer

WILLIAM E. SCHUYLER, JR.
Commissioner of Patents